US011649772B2

(12) United States Patent
Zepeda et al.

(10) Patent No.: US 11,649,772 B2
(45) Date of Patent: May 16, 2023

(54) ENHANCED ENGINE FRICTION GENERATION

(71) Applicants: Hyundai Motor Company, Seoul (KR); Kia Corporation, Seoul (KR)

(72) Inventors: Alexander Zepeda, Riverside, CA (US); Dean Schlingmann, San Dimas, CA (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 2 days.

(21) Appl. No.: 17/392,801

(22) Filed: Aug. 3, 2021

(65) Prior Publication Data
US 2023/0043345 A1    Feb. 9, 2023

(51) Int. Cl.
*F02D 13/02* (2006.01)
*B60W 30/182* (2020.01)
*B60L 58/10* (2019.01)

(52) U.S. Cl.
CPC .......... *F02D 13/0215* (2013.01); *B60L 58/10* (2019.02); *B60W 30/182* (2013.01)

(58) Field of Classification Search
CPC .... F02D 13/0215; B60L 58/10; B60W 30/182
USPC .......... 123/198 F, 481, 90.15; 701/103, 112, 701/113
See application file for complete search history.

(56) References Cited

U.S. PATENT DOCUMENTS

| | | | | |
|---|---|---|---|---|
| 5,012,778 A | * | 5/1991 | Pitzi | F01L 13/065 123/321 |
| 5,255,650 A | * | 10/1993 | Faletti | F01L 9/10 123/90.11 |
| 8,776,738 B2 | * | 7/2014 | Vorih | F01L 1/2411 123/90.15 |
| 8,813,704 B2 | | 8/2014 | Kim et al. | |
| 2019/0202433 A1 | | 7/2019 | Ahn et al. | |

FOREIGN PATENT DOCUMENTS

KR    2019-0080344 A    7/2019

* cited by examiner

*Primary Examiner* — Hai H Huynh
(74) *Attorney, Agent, or Firm* — Fox Rothschild LLP

(57) ABSTRACT

Methods and systems are described for enhanced engine friction generation. The enhanced engine friction generation improves the effectiveness of vehicle braking in deceleration fuel cut-off driving conditions by using engine vacuum and backpressure to temporarily increase engine pumping losses, thereby increasing powertrain drag and increasing deceleration torque to the wheels. The engine vacuum and backpressure may be created by changing the duration of the intake and/or exhaust valves. The system includes a processor and a non-transitory computer-readable storage medium storing instructions that, when executed by the processor, cause the processor to perform operations comprising adjusting an intake valve time duration or an exhaust valve time duration to increase engine friction to enhance mechanical friction on a drivetrain of a vehicle.

19 Claims, 9 Drawing Sheets

| Drive mode | Inhale duration | Exhale duration |
|---|---|---|
| Normal | Unchanged | Unchanged |
| Eco | Increased | Decreased |
| Sport | Decreased | Decreased |
| Snow/Ice | Increased | Increased |
| Off Road | Decreased | Decreased |
| EV-Only | Unchanged | Unchanged |

FIG. 4

ENHANCED ENGINE FRICTION GENERATION

TECHNICAL FIELD

The present disclosure relates generally to engines, and more particularly, to generating enhanced engine pumping losses.

BACKGROUND

Engine braking may provide frictional force to decelerate a vehicle. In conventional vehicles, engine braking may provide minimal braking assistance when the engine is engaged with the drivetrain. In some hybrid vehicles, battery regeneration may provide minimal braking assistance as a motor harnesses power from the drivetrain to charge a battery. But this braking assistance dissipates once the battery has reached a peak state of charge. Loss of the minimal braking assistance may create an inconsistent deceleration experience for a driver. For example, the braking assistance from recharging the battery may be lost while coasting downhill once the battery is fully charged and drivetrain is no longer engaged with the motor. Without the braking assistance from the motor, the rate of deceleration of the vehicle may shift unexpectedly and potentially alarm the driver. Other hybrid vehicles equipped with batteries or motors with low charge capabilities may not gain the added braking assistance.

Currently, engine braking may have a minimal deceleration effect when the engine is engaged with the drivetrain. In some hybrid vehicles, an unexpected change in rate of deceleration may occur when the motor ceases to draw power from the drivetrain to charge the battery.

SUMMARY

The present disclosure provides a system and method for generating enhanced engine pumping losses.

In one aspect, there is provided a system including at least one processor and at least one memory. The at least one memory may store instructions. When executed by the at least one data processor, the instructions may cause the at least one data processor to at least: adjust an intake valve time duration or an exhaust valve time duration to increase engine friction to enhance mechanical friction on a drivetrain of a vehicle. Additionally, the operations include determining that the vehicle requires deceleration, and in response, adjusting the intake valve duration or the exhaust valve time duration to increase engine friction and decelerate the vehicle. The determination that the vehicle requires deceleration is based on at least one of a road gradient, a traffic sign, a traffic light, a construction zone, a change in a speed limit, an obstacle in a road, a tire losing traction, a road curvature, an applied brake of the vehicle, or a cutoff of fuel to an engine. The vehicle may include an engine having a cylinder with an intake valve, the intake valve may be controlled to be in at least two open positions by the processor and an engine having a cylinder with an exhaust valve, the exhaust valve may be controlled to be in at least two open positions by the processor.

In one exemplary embodiment, the adjusting of the intake valve duration includes increasing a time interval for which an intake valve is open to increase volume of air flowing into a cylinder during an intake stroke. The adjusting of the intake valve duration also includes reducing a time interval for which an intake valve is open to increase a vacuum in a cylinder during an intake stroke. The adjusting of the exhaust valve time duration includes decreasing a time interval for which an exhaust valve is open to increase backpressure in a cylinder during an exhaust stroke.

In some embodiments, the intake valve time duration and the exhaust valve time duration are based on a drive mode. The drive mode is at least one of the following modes economy, sport, snow, off road, and electric power only. The intake valve time duration and the exhaust valve time duration is further based on a throttle position sensor calibration table, a valve calibration table, and an exhaust valve calibration table. In another embodiment, the intake valve time duration and the exhaust valve time duration is based on at least one of a deceleration level table, a throttle position sensor calibration table, a valve calibration table, and an exhaust valve calibration table.

The operations further include determining that a battery configured to power the vehicle satisfies a predetermined threshold and in response to determining that the vehicle requires deceleration and that the battery satisfies the predetermined threshold, adjusting the intake valve time duration and the exhaust valve time duration to increase engine friction to enhance mechanical friction on the drivetrain of the vehicle.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 depicts a table illustrating an example of drive modes configured to adjust the intake valve time duration and the exhaust valve time duration;

DETAILED DESCRIPTION

Engine friction may be modified by altering the time duration for which an intake valve is open and/or an exhaust valve is open. The intake valve may control air flowing into an engine cylinder. The exhaust valve may control air exiting the engine cylinder. The engine friction may be controlled by modifying the time duration for which the intake valve is open. The engine friction may be controlled by modifying the time duration for which the exhaust valve is open. Increased engine friction may be transferred to the drivetrain to assist with the deceleration of the vehicle.

The intake valve and the exhaust valve may increase the effective engine friction by adjusting the time duration for which the intake valve and the exhaust valve are open. For example, the time duration for which the intake valve is open may be increased or decreased. Decreasing the time duration for which the intake valve is open may generate an increased vacuum during the intake stroke and create engine friction. In another example, the time duration for which the exhaust valve is open may be shortened. Shortening the time duration for which the exhaust valve is open may generate backpressure during an exhaust stroke and create engine friction. The increased engine friction may create deceleration torque that effectively decreases the momentum of the vehicle through the drivetrain.

Increased engine friction may increase the lifespan of the brake components (e.g., brake pads, rotors) by assisting in the deceleration of the vehicle. The engine friction may be controlled by adjusting the intake valve time duration and the exhaust valve time duration based on the deceleration needs of the vehicle. Engine friction may be an alternative to excessive brake usage. Engine friction may be controlled by selecting a setting or a default setting specific to a drive mode. Increased engine friction may also be used in hybrid vehicles where powertrain momentum is no longer utilized to generate power for charging a battery.

Methods, systems, apparatuses, and non-transitory storage mediums are described herein for generating engine friction by modifying the time during which the intake valve and the exhaust valve are open. In some embodiments, a processor may control the time duration for which the intake valve and the exhaust valve are open based on deceleration needs. Contrary to the trend of minimizing engine friction to increase fuel economy, engine friction here is enhanced to maximize the engine load. Embodiments described herein may be applied to all vehicles, including hybrid and conventional vehicles/engines.

Figures 1A, 1B:
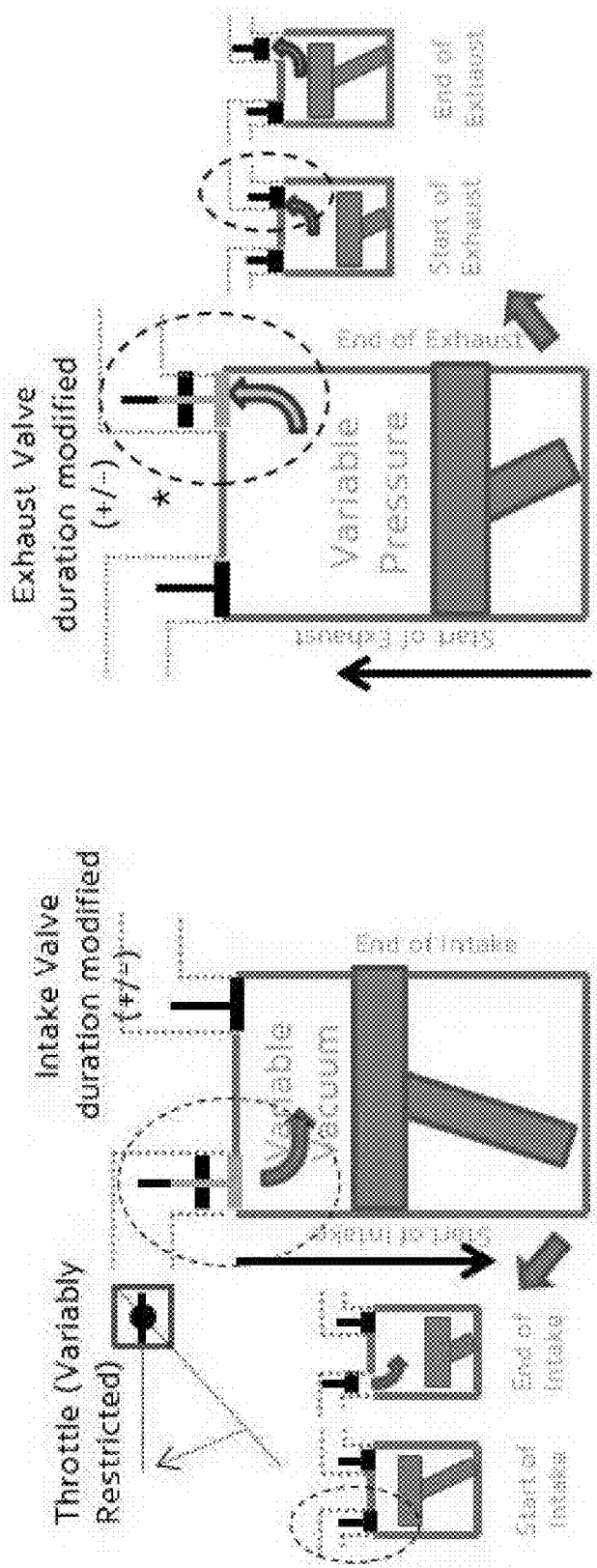
FIG. 1A depicts a diagram illustrating an example of a cylinder during an intake stroke with an intake valve configured to be open for a time duration.
FIG. 1B depicts a diagram illustrating an example of a cylinder during an exhaust stroke with an exhaust valve configured to be open for a time duration.

FIG. 1A depicts a diagram illustrating an example of a cylinder during an intake stroke with an intake valve configured to be open for a time duration. A processor may be communicatively coupled to the intake valve at a cylinder. The processor may be configured to control the duration for which the intake throttle valve is open. The processor may be configured to control a position of the intake throttle valve. For example, the processor may be configured to open the intake valve at 25% of its maximum open duration time. The processor may open the intake throttle valve at various positions relative to its maximum open position. The processor may be an electronic control unit or another computing unit coupled to the vehicle.

The intake valve time duration may be increased or decreased to enhance engine friction for each piston stroke. Increasing or decreasing the time duration for which the intake valve is open may modify the vacuum or pressure inside the cylinder. For example, the intake valve time duration may be increased to maximize the amount of air entering the cylinder. This increased amount of air may increase cylinder backpressure during the exhaust stroke. In another example, the intake valve open time duration may be reduced to prohibit air flowing into the cylinder and increase the vacuum in the cylinder. The increased vacuum in the cylinder resists the downward motion of the piston head, which increases the pumping loss and deceleration torque.

In some embodiments, the intake valve time duration is modified in response to a deceleration event. The deceleration event may be an event that requires the vehicle to slow down or stop, including a downhill road gradient, a traffic sign, a traffic light, a construction zone, a change in a speed limit, an obstacle in a road, a tire losing traction, a road curvature, an applied brake of the vehicle, and/or a cutoff of fuel to an engine.

The increased engine pumping losses caused by the intake valve time duration may enhance vehicle deceleration (e.g., vehicle braking performance). The intake valve time duration may be modified based on a desired performance characteristic of the powertrain and vehicle.

FIG. 1B depicts a diagram illustrating an example of a cylinder during an exhaust stroke with an exhaust valve configured to be open for a time duration. A processor may be communicatively coupled to the exhaust valve at a cylinder. The processor may be configured to control the duration for which the exhaust valve is open. For example, the processor may open the exhaust valve at 25% of its maximum open time duration. The processor may be an electronic control unit or another computing unit coupled to the vehicle.

The exhaust valve time duration may be increased or decreased to enhance engine friction for each piston stroke. Increasing or decreasing the time duration for which the exhaust valve is open may modify the vacuum inside the cylinder. For example, the exhaust valve open time duration may be decreased to increase cylinder backpressure. This increased cylinder backpressure may be caused by air pushing back down on the piston head. The prolonged closure of the exhaust valve may block the escape route of air, which increases the backpressure, engine friction, and deceleration torque.

In some embodiments, the exhaust valve time duration is modified in response to a deceleration event. The deceleration event may be an event that requires the vehicle to slow down or stop, including a steep downhill road gradient, a traffic sign, a traffic light, a construction zone, a change in a speed limit, an obstacle in a road, a tire losing traction, a road curvature, an applied brake of the vehicle, and/or a cutoff of fuel to an engine.

The increased engine friction caused by the exhaust valve time duration may enhance vehicle deceleration (e.g., vehicle braking performance). The exhaust valve time duration may be modified based on a desired performance characteristic of the powertrain and vehicle.

Figure 1D:
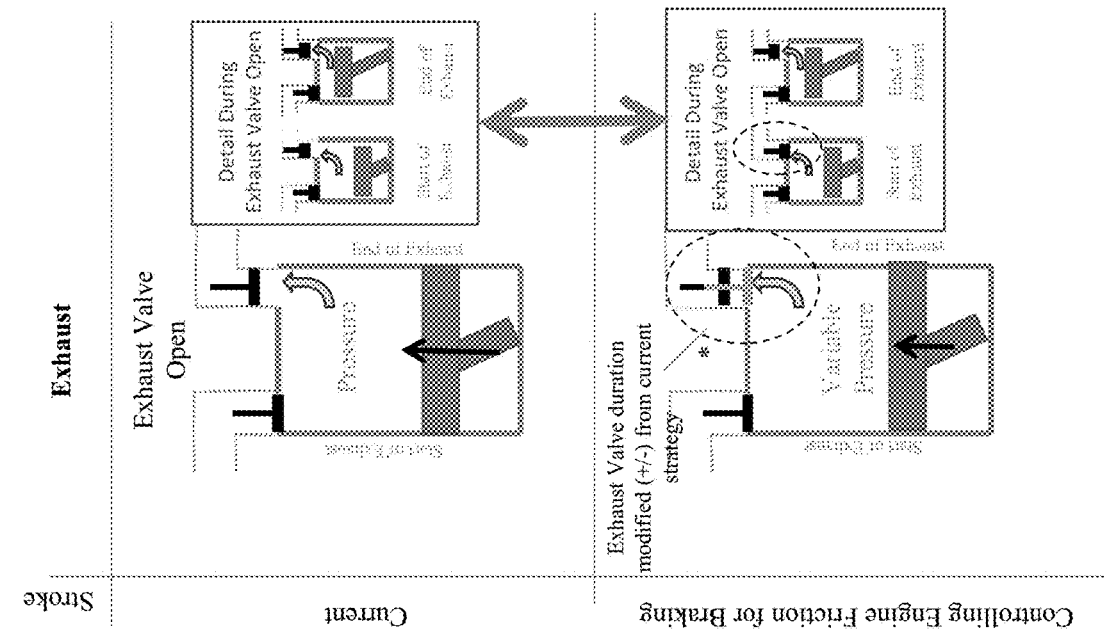
FIG. 1D depicts a diagram illustrating an exemplary comparison between an exhaust valve during an exemplary exhaust stroke and an exhaust valve during an engine friction-inducing exhaust stroke.
Figure 1C:
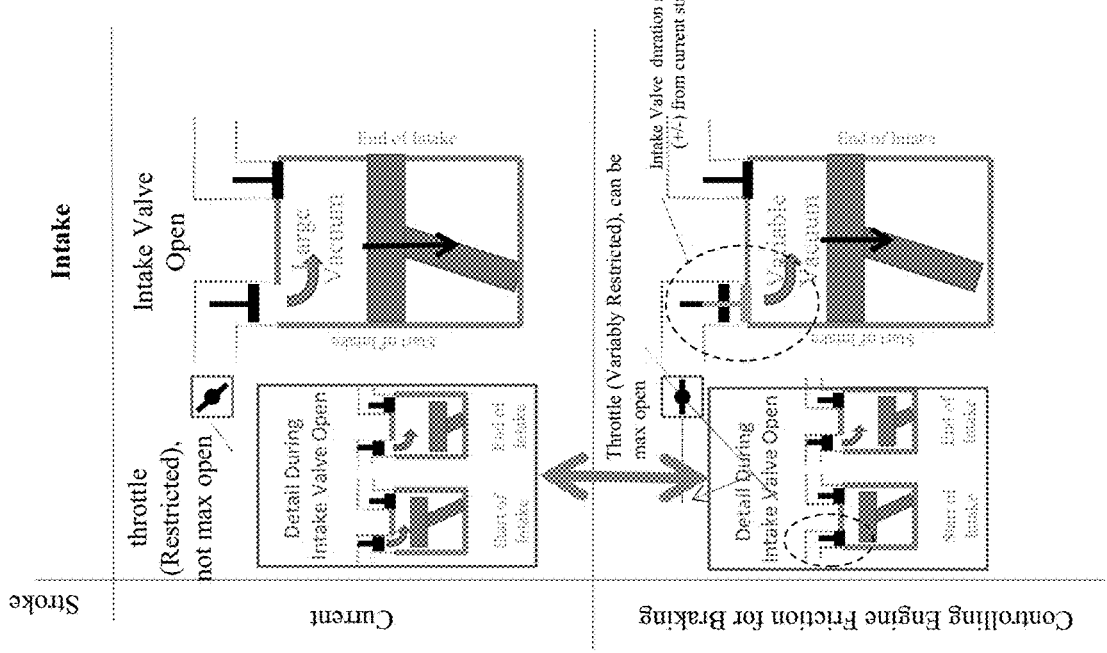
FIG. 1C depicts a diagram illustrating an exemplary comparison between an intake valve during an exemplary intake stroke and an intake valve during an engine friction-inducing intake stroke.

FIG. 1C depicts a diagram illustrating an exemplary comparison between an intake valve during an exemplary intake stroke and an intake valve during a friction-inducing intake stroke. The intake valve may modify the engine friction by enhancing the vacuum and backpressure in the cylinder. The intake valve open duration may be changed to control the amount of air flowing into the cylinder. The increased engine friction caused by the time intervals for which the intake valve is open may increase powertrain drag and increase deceleration torque on the wheels.

In an exemplary intake stroke, the intake valve is open at the start of the intake stroke and at the end of the intake stroke. The intake valve may be open for a predetermined amount of time to allow fresh air to enter the cylinder. The predetermined amount of time may minimize the engine pumping losses. The throttle may be partially open or restricted in order to control the amount of air flowing into the cylinder through the intake valve. A large vacuum may be created by the enabling the intake valve to be open for a predetermined amount of time.

The intake valve may be open for less time in a friction-inducing intake stroke in comparison to the normal intake stroke. For example, the intake valve may be closed at the start of the intake stroke instead of open at the start of the intake stroke, as is the situation with an exemplary intake stroke. The intake valve may open at or near the end of the intake stroke, which reduces the time interval for which the intake valve is open and enhances engine braking. Engine braking may be enhanced by the vacuum that is created by air restriction during the intake stroke.

FIG. 1D depicts a diagram illustrating an exemplary comparison between an exhaust valve during an exemplary exhaust stroke and an exhaust valve during a friction-inducing exhaust stroke. The exhaust valve may modify the engine friction by enhancing the vacuum and backpressure in the cylinder. The increased engine friction caused by the time intervals for which the exhaust valve is open may increase powertrain drag and increase deceleration torque on the wheels.

In an exemplary exhaust stroke, the exhaust valve is open at the start of the exhaust stroke and at the end of the exhaust stroke. The exhaust valve may be open for a predetermined amount of time to allow pressurized air to escape. The predetermined amount of time may be calculated to reduce engine friction. A large air pressure may be present in the cylinder due to the preceding power stroke. The pressurized air exits through the open exhaust valve at the beginning of the exhaust stroke and at the end of the exhaust stroke.

The exhaust valve may be open for less time in friction-inducing exhaust stroke in comparison to an exemplary exhaust stroke. For example, the exhaust valve may be closed at the start of the exhaust stroke instead of open at the start of the exhaust stroke, as is the situation with an exemplary exhaust stroke. The exhaust valve may open at or near the end of the intake stroke, reducing the time interval for which the intake valve is open and enhancing engine braking. Increased cylinder backpressure may generate engine braking that is created by air restriction during the exhaust stroke.

Figure 2A:
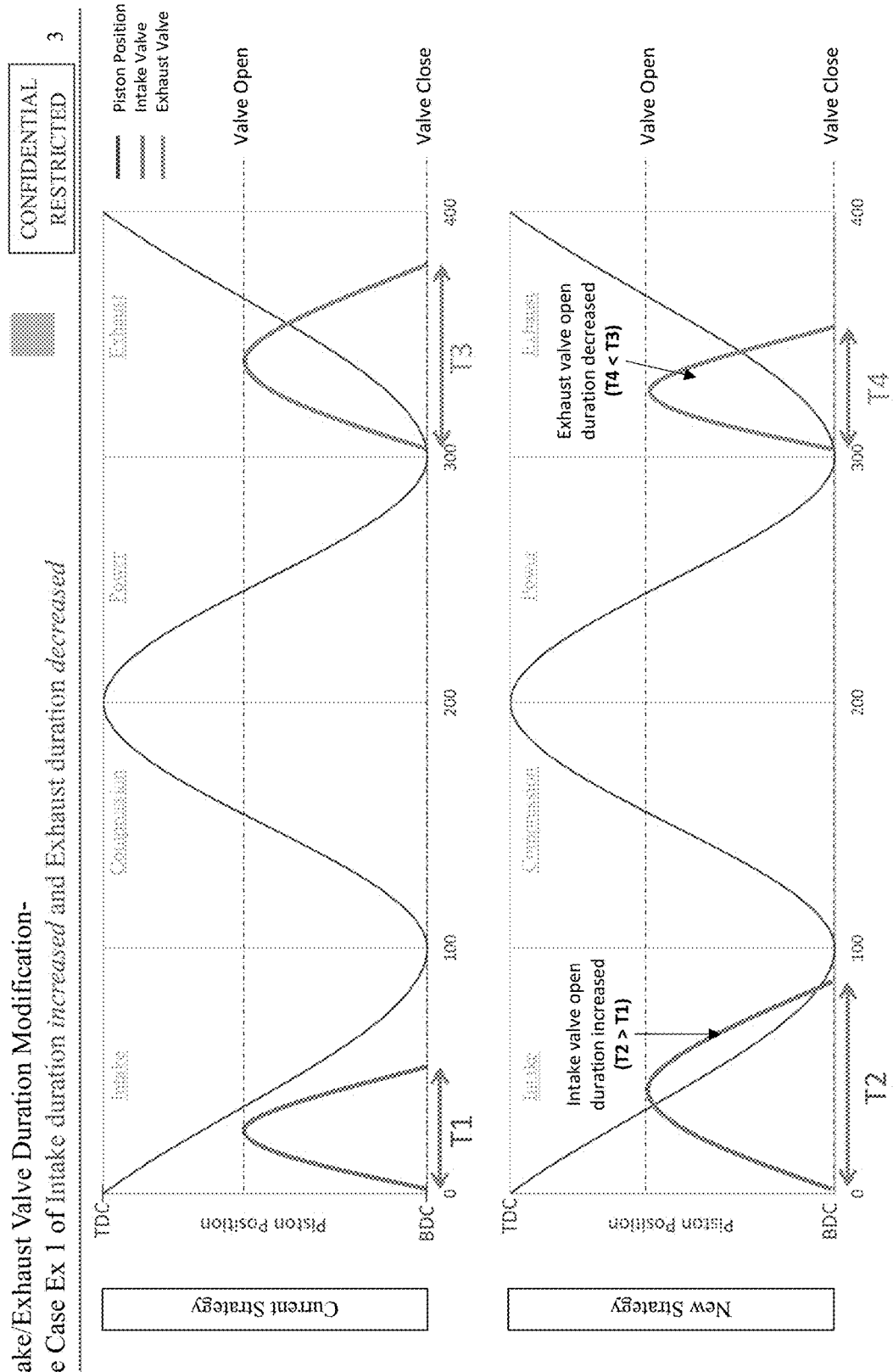
FIG. 2A depicts a graph illustrating an exemplary comparison between an intake valve time duration during an exemplary intake stroke and an intake valve time duration during a friction-inducing intake stroke.

FIG. 2A depicts a graph illustrating an exemplary comparison between an intake valve time duration during an exemplary intake stroke and an intake valve time duration during a friction-inducing intake stroke. The graph compares the exemplary intake stroke and the friction inducing intake stroke at various crankshaft degree positions and the exemplary exhaust stroke and the friction-inducing exhaust stroke at various crankshaft degree positions. The graph displays various stroke stages at different crankshaft degree positions when the intake valve and exhaust valve are open, such as the intake stroke, the compression stroke, the power stroke, and the exhaust stroke. The vertical lines represent the respective beginning and end of each stroke, top dead center (TDC) to bottom dead center (BDC). The horizontal dotted line represents the respective position of the intake/exhaust valves, open to closed. The top portion of the graph displays stroke cycles with exemplary intake valve time durations and exhaust valve time durations at various crankshaft degree positions. The bottom portion of the graph displays stroke cycles with modified intake valve time durations and exhaust valve time durations at various crankshaft degree positions. The modified time durations increase the air intake during an intake stroke (by extending duration and/or increasing crankshaft degree positions during which the intake valve is open) and the exiting of the pressurized air is minimized during the exhaust stroke (by reducing duration and/or decreasing crankshaft degree positions during which the intake valve is open).

In the bottom portion of the graph, the intake valve time duration may be increased in comparison to the top portion of the graph. Additionally, and/or alternatively, the number of crankshaft degree positions during which the intake valve is open may be increased in comparison to the top portion of the graph. This increased time duration and/or increased crankshaft degree positions may enable an increased amount of air to enter the cylinder in comparison to an exemplary intake stroke. This increased amount of air may allow an increased cylinder backpressure to build during the exhaust stroke. Increased cylinder backpressure may generate engine braking that is created by air restriction during the exhaust stroke.

Also in the bottom portion of the graph, the exhaust valve time duration may be reduced in comparison to the top portion of the graph. Additionally, and/or alternatively, the number of crankshaft degree positions during which the exhaust valve is open may be reduced in comparison to the top portion of the graph. The reduced time duration and/or reduced crankshaft degree positions may increase cylinder backpressure. Increased cylinder backpressure may be caused by air pushing back down on the piston head. Pressurized air may push back against the piston head due to the closed exhaust valve blocking the escape route, which increases the pumping loss and deceleration torque. As shown in the bottom portion of the graph, the exhaust valve time duration and/or crankshaft degree positions during which the exhaust valve is open may be decreased during the exhaust stroke to slowly expel cylinder pressure. The engine friction and deceleration torque may be increased by decreasing the duration and/or crankshaft degree positions in which the exhaust valve is open. The intake valve time duration and the exhaust valve time duration may be modified based on a desired performance characteristic of the powertrain and vehicle.

Figure 2B:
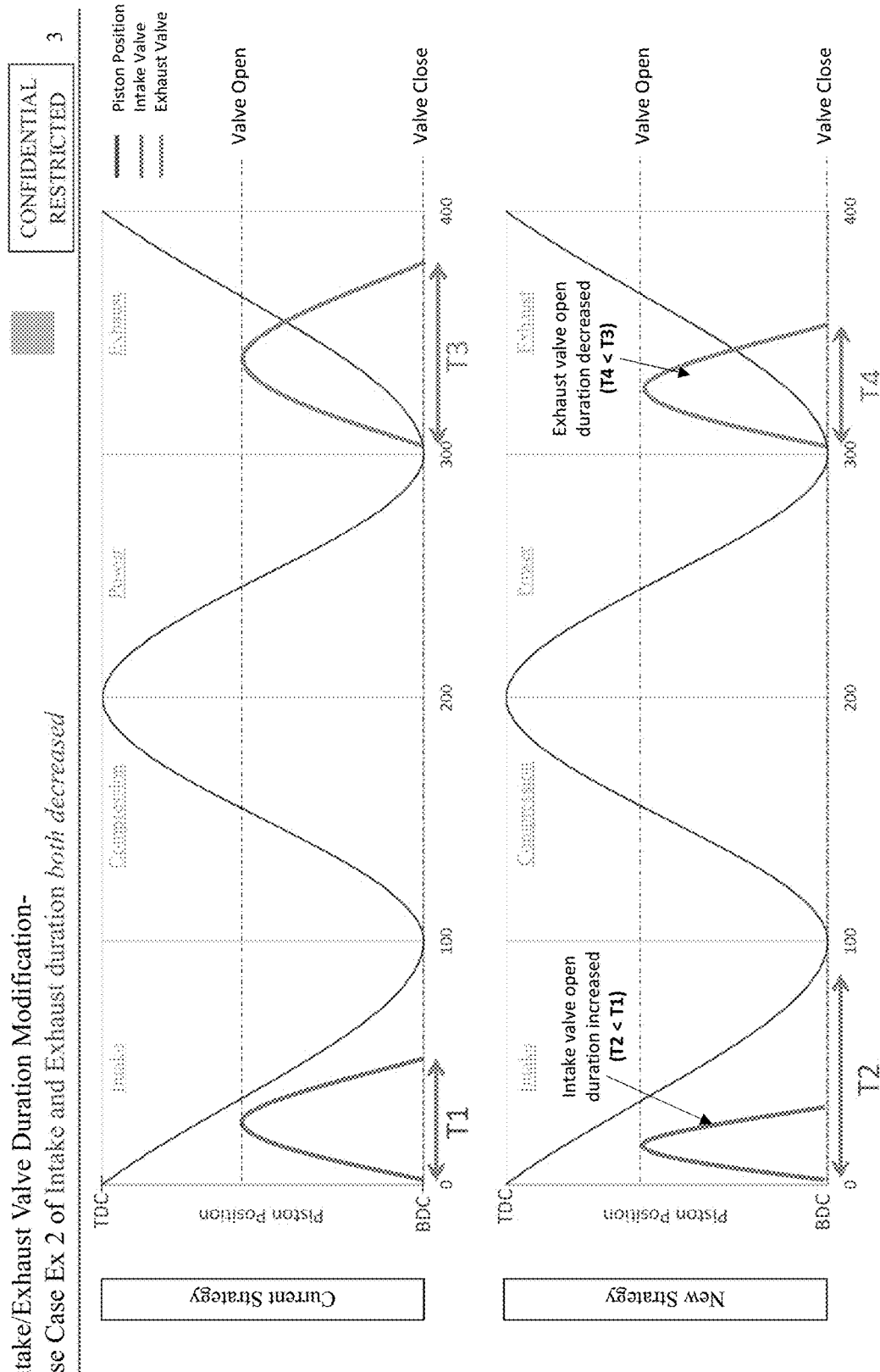
FIG. 2B depicts a graph illustrating an exemplary comparison between an exhaust valve time duration during an exemplary exhaust stroke and an exhaust valve time duration during a friction-inducing exhaust stroke.

FIG. 2B depicts a graph illustrating an exemplary comparison between an exhaust valve time duration during an exemplary exhaust stroke and an exhaust valve time duration during a friction-inducing exhaust stroke. The graph compares the exemplary intake stroke and the friction-inducing intake stroke at various crankshaft degree positions and the exemplary exhaust stroke and the friction-inducing exhaust stroke at various crankshaft degree positions. The graph displays the various stroke stages at different crankshaft degree positions when the intake valve and exhaust valve are open, such as the intake stroke, the compression stroke, the power stroke, and the exhaust stroke. The vertical lines represent the respective beginning and end of each stroke. The horizontal dotted line represents the respective position of the intake/exhaust valves, open to closed. The top portion of the graph displays stroke cycles with exemplary intake valve time durations and exhaust valve time durations at various crankshaft degree positions. The bottom portion of the graph displays stroke cycles with modified intake valve time durations and exhaust valve time durations at various crankshaft degree positions. The modified time durations decrease the air intake during an intake stroke (by reducing duration and/or decreasing crankshaft degree positions during which the intake valve is open) and the exiting of the pressurized air is minimized during the exhaust stroke (by reducing duration and/or decreasing crankshaft degree positions during which the intake valve is open).

In the bottom portion of the graph, the intake valve time duration may be reduced in comparison to the top portion of the graph. Additionally, and/or alternatively, the number of crankshaft degree positions during which the intake valve is open may be reduced in comparison to the top portion of the graph. This reduced time duration and/or reduced crankshaft degree positions may minimize the amount of air entering the cylinder in comparison to an exemplary intake stroke. The reduced amount of air may prohibit air flowing into the cylinder and increase the vacuum in the cylinder. The increased vacuum in the cylinder resists the downward motion of the piston head, which increases the pumping loss and deceleration torque. Engine braking may be enhanced by the vacuum that is created by air restriction during the intake stroke.

Also in the bottom portion of the graph, the exhaust valve time duration may be reduced in comparison to the top portion of the graph. Additionally, and/or alternatively, the number of crankshaft degree positions during which the exhaust valve is open may be reduced in comparison to the top portion of the graph. This reduced time duration and/or reduced crankshaft degree positions may increase cylinder backpressure. The increased cylinder backpressure may be caused by air pushing back down on the piston head. The pressurized air may push back against the piston head due to the closed exhaust valve blocking the escape route, which increases the pumping loss and deceleration torque. The engine friction and deceleration torque may be increased by delaying the opening of the exhaust valve. Additionally, and/or alternatively, the engine friction and deceleration torque may be increased by delaying the opening of the exhaust valve until a later crankshaft degree position. The intake valve time duration and the exhaust valve time duration may be modified based on a desired performance characteristic of the powertrain and vehicle.

Figure 3:
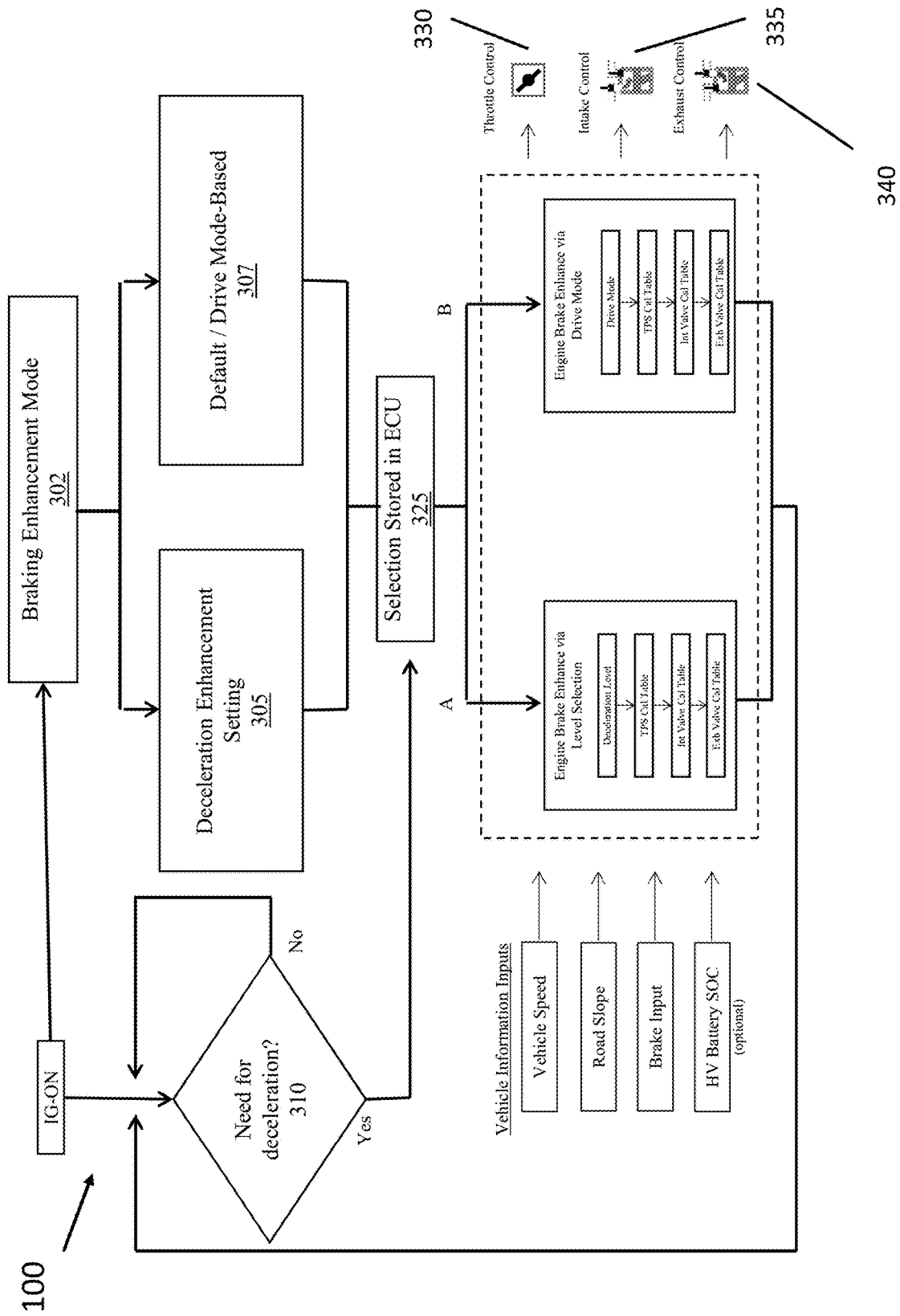
FIG. 3 depicts a flowchart illustrating an example of a process for controlling an intake valve time duration and an exhaust valve time duration based on a user setting or a drive mode.

FIG. 3 depicts a flowchart illustrating an example of a process for controlling an intake valve time duration and an exhaust valve time duration based on a user setting or a default/drive mode-based, predetermined setting. Increased engine friction may be transferred to the drivetrain to assist with the deceleration of the vehicle based on a setting or a drive mode-based setting. Increased engine friction may be applied upon selection of a setting or a specific drive mode or default setting. The engine friction may be used as an alternative to excessive brake usage.

At 302, a braking enhancement mode 302 may be selected. The braking enhancement mode 302 may be toggled on or off by a user or by the vehicle's default behavior based on predetermined thresholds. The braking enhancement mode 302 may toggle a deceleration enhancement setting 305 on or off. The deceleration enhancement setting 305 may determine the intensity of the engine friction. A higher engine friction may correspond to a higher numerical value or indicator. The deceleration enhancement setting 305 may tune and enhance the intensity of the engine friction. The braking enhancement mode 302 may be toggled by a user selecting a drive mode 307, or user remaining in a drive mode, which may be considered a default setting. The drive mode 307 may be one of various drive modes, including sport, eco, and towing. The drive mode 307 may tune and enhance the intensity of the engine friction. The braking enhancement mode 302 and corresponding information related to the deceleration enhancement setting 305 and/or the drive mode 307 may be stored in the electronic control unit.

At 310, whether the vehicle needs to decelerate is determined. The vehicle may need to decelerate based on an accelerator pedal, a deceleration torque demand, a motor torque, a downhill road gradient, a traffic sign, a traffic light, a construction zone, a change in a speed limit, an obstacle in a road, a tire losing traction, a road curvature, an applied brake of the vehicle, and/or a cutoff of fuel to an engine. In some embodiments, the vehicle may need to decelerate when the deceleration torque demand is greater than the motor torque. The vehicle may need to decelerate if the deceleration torque demand is greater than the motor torque and the clutch is engaged.

At 325, the throttle 330, the intake control 335, and the exhaust control 340 may be controlled based on the deceleration enhancement setting 305 and the drive mode 307 in response to determining the need for deceleration. The throttle 330, the intake control 335, and the exhaust control 340 may be controlled based on the deceleration enhancement setting 305. The deceleration enhancement setting 305 may be mapped to a deceleration level table, a throttle position sensor calibration table, an intake valve calibration table, and an exhaust valve calibration table. The deceleration enhancement setting 305 may determine the intake valve time duration and the exhaust valve time duration. The throttle 330, the intake control 335, and the exhaust control 340 may be controlled based on the drive mode 307. The drive mode may be mapped to another throttle position sensor calibration table, another intake valve calibration table, and another exhaust valve calibration table. The drive mode 307 may determine the intake valve time duration and the exhaust valve time duration.

The intake valve calibration table may control the intake valve time duration. The exhaust valve calibration table may control the exhaust valve time duration. The throttle position sensor calibration table may determine the displacement of the intake valve and the displacement of the exhaust valve during an intake stroke and an exhaust stroke. The deceleration level table, the throttle position sensor calibration table, the intake valve calibration table, and the exhaust valve calibration table may be based on vehicle information, such as vehicle speed, road slope, brake input, and/or a battery state of charge. Intake valve timing calibration and exhaust valve timing calibration may be modified based on a closed-loop function to achieve a target engine friction. The various calibrations in the tables may target different driving scenarios and account for non-driver related vehicle inputs and system inputs.

FIG. 4 depicts a table illustrating an example of drive modes configured to adjust the intake valve time duration and the exhaust valve time duration. The drive mode 307 may tune and enhance the intensity of the engine friction. The throttle 330, the intake control 335, and the exhaust control 340 may be controlled based on the drive mode 307. The drive mode may be mapped to a throttle position sensor calibration table, an intake valve calibration table, and an exhaust valve calibration table. The drive mode 307 may control the intake valve time duration and the exhaust valve time duration.

The drive mode may be one of normal, economy, sport, snow/ice, off road, towing or electric vehicle. In normal drive mode, the intake valve time duration and the exhaust valve time duration may be unchanged. In economy mode, the intake valve time duration may be increased and the exhaust valve time duration may be decreased. In sport mode, the intake valve time duration may be decreased and the exhaust valve time duration may be decreased. In snow/ice drive mode, the intake valve time duration may be increased and the exhaust valve time duration may be increased. In off-road drive mode, the intake valve time duration may be decreased and the exhaust valve time duration may be decreased. In off-road drive mode, the intake valve time duration may be decreased and the exhaust valve time duration may be decreased. In electric vehicle drive mode, the intake valve time duration and the exhaust valve time duration may be unchanged.

Each drive mode may have the engine friction specifically tuned for specific performance characteristics. For example, the engine friction may be maximized for an off-road drive mode. In another example, the engine friction for a sport drive mode may be less intense than an off-road drive mode. In another example, the engine friction is minimized as a hybrid vehicle battery reaches a fully charged state.

Figure 5B:
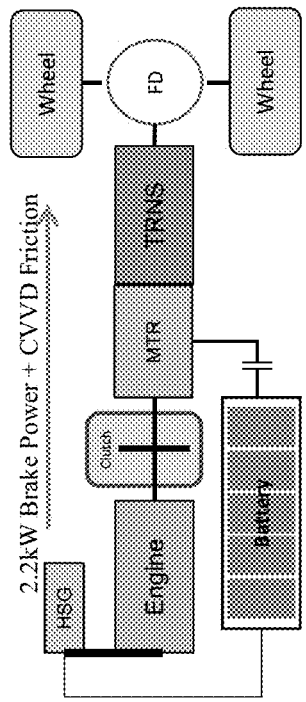
FIG. 5B depicts a diagram illustrating an example of a vehicle powertrain with an engaged clutch in which engine braking is enabled to decelerate the hybrid vehicle when the battery is already recharged.
Figure 5A:
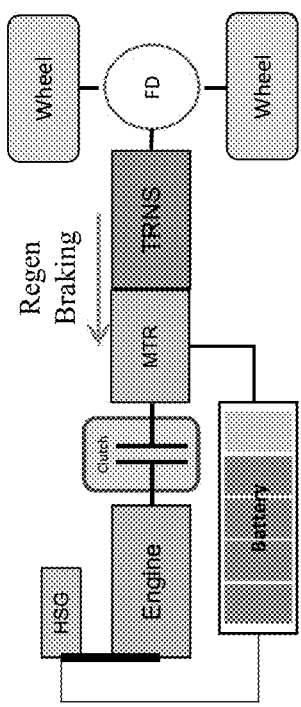
FIG. 5A depicts a diagram illustrating an example of a hybrid vehicle powertrain with a disengaged clutch configured to recharge a battery via motor regeneration.

FIG. 5A depicts a diagram illustrating an example of a hybrid vehicle powertrain with a disengaged clutch configured to recharge a battery via motor regeneration. Motor regeneration may harness kinetic energy from the wheels to regenerate electricity to charge the battery while the clutch is disengaged. Motor regeneration may create a minimal braking assistance by utilizing torque from the powertrain to recharge the battery as the vehicle decelerates. This minimal braking assistance may dissipate as the battery reaches a fully charged state. Loss of minimal braking assistance may create an inconsistent deceleration experience for a driver. For example, the braking assistance may discontinue while coasting downhill when the battery reaches a peak state of charge and drivetrain is no longer engaged with the regeneration motor. Without the braking assistance from the regeneration motor, the rate of deceleration of the vehicle may shift unexpectedly and alarm the driver. Other hybrid vehicles may not provide minimal braking assistance if the hybrid vehicles are equipped with batteries and motors with low charging capabilities.

FIG. 5B depicts a diagram illustrating an example of a vehicle powertrain with an engaged clutch in which engine braking is enabled to decelerate the hybrid vehicle when the battery is already recharged. The hybrid vehicle may have less deceleration force once the battery has reached a peak state of charge. The hybrid vehicle may utilize increased engine friction to decelerate with the clutch engaged where braking assistance or powertrain momentum is no longer utilized to generate power for charging a battery. For example, the braking assistance may be lost while coasting downhill after the battery reaches a peak state of charge and drivetrain is no longer engaged with the regeneration motor. To help decelerate the vehicle and prove a smoother driving experience, the hybrid vehicle may modify the intake valve time duration or the exhaust valve time duration to increase engine friction. Increasing the engine friction may provide consistent deceleration when motor regeneration stops when the battery is fully recharged. In another example, the deceleration motor torque may be insufficient to slow the hybrid vehicle as it approaches a stop sign and, as a result, the hybrid vehicle increases the engine friction with the clutch engaged. In another example, the hybrid vehicle (or any other vehicle) may determine that additional deceleration torque is necessary and enable engine braking with the clutch engaged. The engine may provide up to 2.2 kW of mechanical friction to the drivetrain to slow the vehicle.

Figure 6:
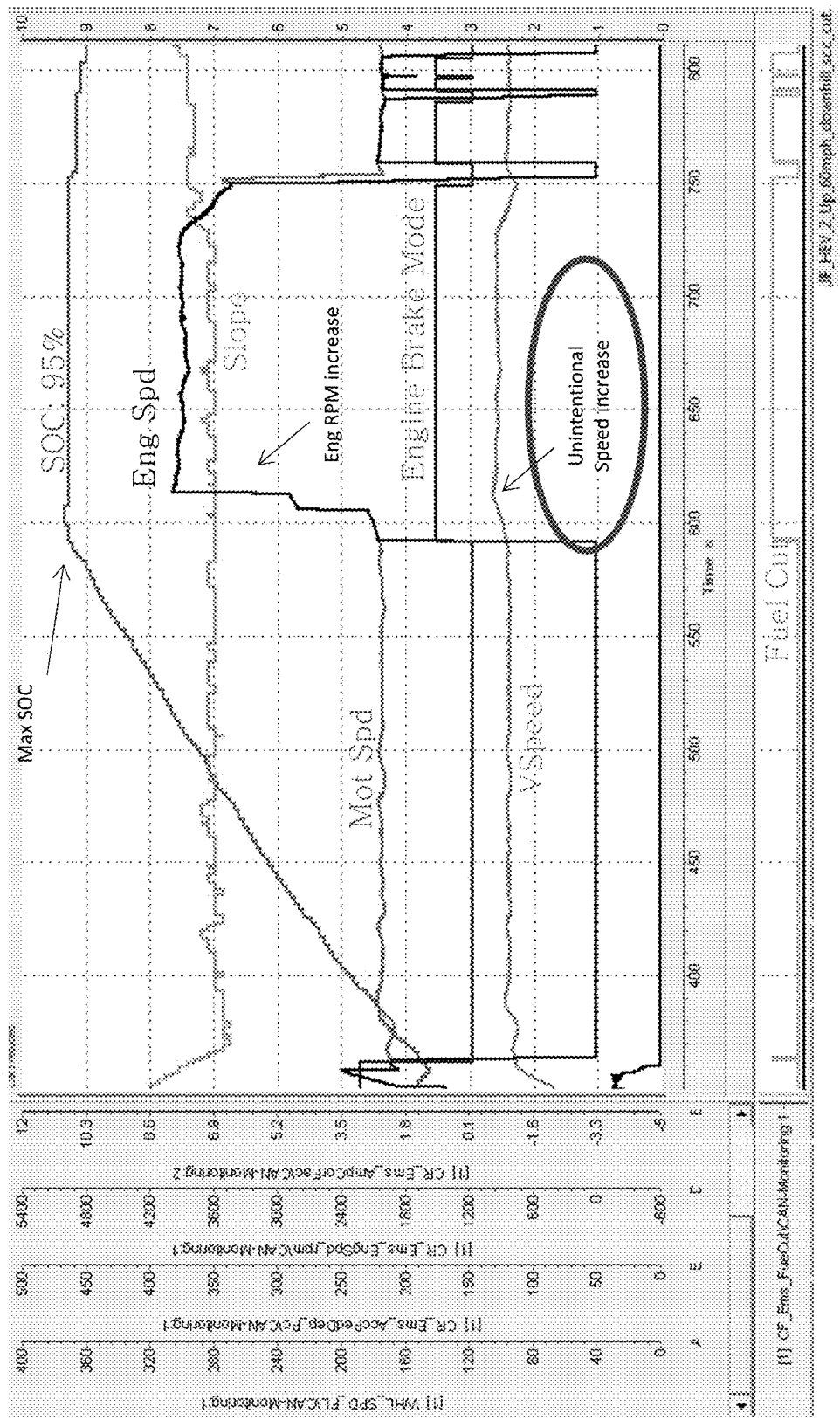
FIG. 6 depicts a graph illustrating a timeline of hybrid vehicle speed increasing in response to the battery reaching a fully charged state.

FIG. 6 depicts a graph illustrating a timeline of hybrid vehicle increasing vehicle speed in response to the battery reaching a fully charged state. The graph may also illustrate a timeline of a hybrid vehicle increasing battery state of charge in a downhill coasting scenario.

The engine brake mode may be engaged when the battery reaches a fully charged state. The engine brake mode may be engaged to provide a smoother deceleration experience when the battery is fully charged by maintaining a consistent deceleration. Alternatively, and/or additionally, the engine brake mode may be engaged when the vehicle needs to decelerate. The hybrid vehicle may increase its engine speed with the clutch engaged in order to generate sufficient frictional force to decelerate the vehicle. The engine speed may increase when the engine brake mode is active.

Figure 7:
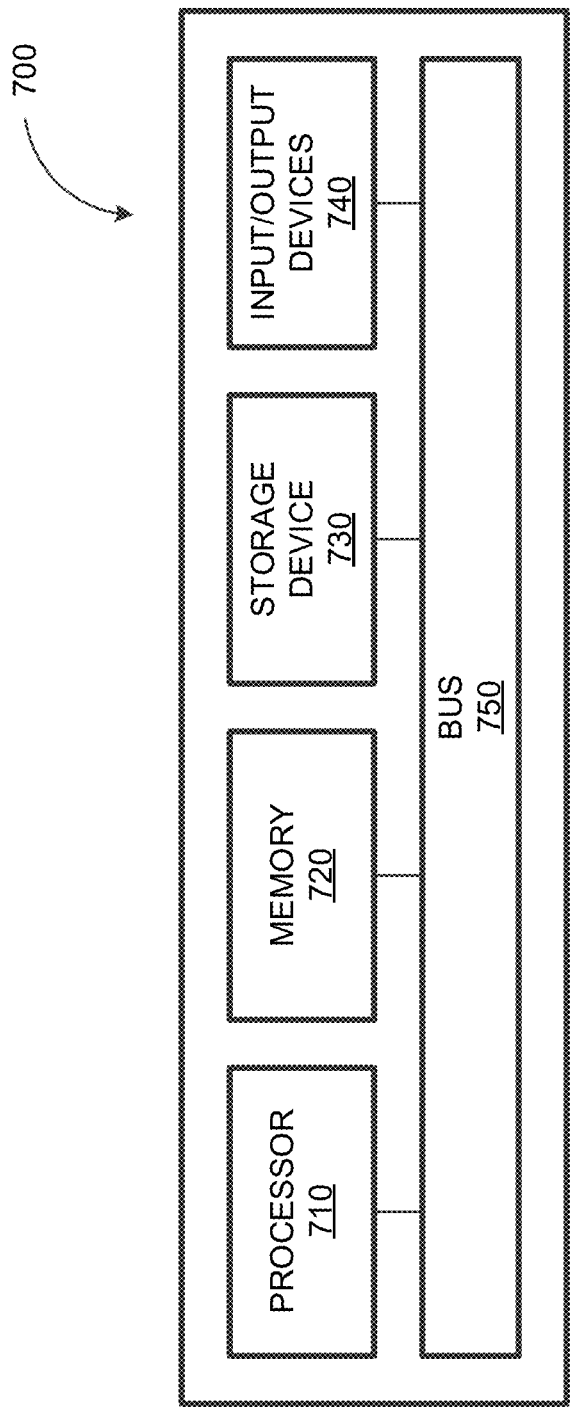
FIG. 7 depicts a block diagram illustrating a computing system 700 consistent with implementations of the current subject matter.

FIG. 7 depicts a block diagram illustrating a computing system 700 consistent with implementations of the current subject matter. Referring to FIGS. 1-7, the computing system 700 can be used to generate enhanced engine friction. For example, the computing system 700 may implement a user equipment, a personal computer, or a mobile device.

As shown in FIG. 7, the computing system 700 can include a processor 710, a memory 720, a storage device 730, and an input/output device 740. The processor 710, the memory 720, the storage device 730, and the input/output device 740 can be interconnected via a system bus 750. The processor 710 is capable of processing instructions for execution within the computing system 700. Such executed instructions can implement one or more components of, for example, electronic controller unit. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer-readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 740. The user interface can be generated and presented to a user by the computing system 700 (e.g., on a computer screen monitor, etc.).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The technical advantages presented herein may result in an increased lifespan of brake components (pads and rotors). The invention increases the effective engine friction by manipulating the intake/exhaust valve duration during deceleration.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
    a processor; and
    a non-transitory computer-readable storage medium storing instructions that, when executed by the processor, cause the processor to perform operations comprising:
        adjusting an intake valve time duration or an exhaust valve time duration to increase engine friction to enhance mechanical friction on a drivetrain of a vehicle;
        determining that a battery configured to power the vehicle satisfies a predetermined threshold; and
        in response to determining that the vehicle requires deceleration and that the battery satisfies the predetermined threshold, adjusting the intake valve time duration and the exhaust valve time duration to increase engine friction to enhance mechanical friction on the drivetrain of the vehicle.

2. The system of claim 1, wherein the operations further comprise:

determining the vehicle requires deceleration; and in response to determining the vehicle requires deceleration, adjusting the intake valve time duration or the exhaust valve time duration to increase engine friction to decelerate the vehicle.

3. The system of claim 1, wherein determining the vehicle requires deceleration is based on at least one of a road gradient, a traffic sign, a traffic light, a construction zone, a change in a speed limit, an obstacle in a road, a tire losing traction, a road curvature, an applied brake of the vehicle, or a cutoff of fuel to an engine.

4. The system of claim 1, wherein the vehicle includes an engine having a cylinder with an intake valve, the intake valve may be controlled to be in at least two open positions by the processor.

5. The system of claim 1, wherein the vehicle includes an engine having a cylinder with an exhaust valve, the exhaust valve may be controlled to be in at least two open positions by the processor.

6. The system of claim 1, wherein the adjusting the intake valve time duration includes increasing a time interval for which an intake valve is open to increase air flowing into a cylinder during an intake stroke.

7. The system of claim 1, wherein the adjusting the intake valve time duration includes reducing a time interval for which an intake valve is open to increase a vacuum in a cylinder during an intake stroke.

8. The system of claim 1, wherein the adjusting the exhaust valve time duration includes decreasing a time interval for which an exhaust valve is open to increase backpressure in a cylinder during an exhaust stroke.

9. The system of claim 1, wherein the intake valve time duration and the exhaust valve time duration are based on a drive mode.

10. The system of claim 9, wherein the drive mode is at least one of an economy mode, a sport mode, a snow mode, an off road mode, and an electric power only mode, and wherein the intake valve time duration and the exhaust valve time duration is further based on a throttle position sensor calibration table, a valve calibration table, and an exhaust valve calibration table.

11. The system of claim 1, wherein the intake valve time duration and the exhaust valve time duration is based on at least one of a deceleration level table, a throttle position sensor calibration table, a valve calibration table, and an exhaust valve calibration table.

12. A non-transitory computer-readable storage medium storing instructions that, when executed by a processor, cause the processor to perform operations comprising:

adjusting an intake valve time duration or an exhaust valve time duration to increase engine friction to enhance mechanical friction on a drivetrain of a vehicle;

determining that a battery configured to power the vehicle satisfies a predetermined threshold; and in response to determining that the vehicle requires deceleration and that the battery satisfies the predetermined threshold, adjusting the intake valve time duration and the exhaust valve time duration to increase engine friction to enhance mechanical friction on the drivetrain of the vehicle.

13. The non-transitory computer-readable storage medium of claim 12, wherein the operations further comprise:

determining the vehicle requires deceleration; and in response to determining the vehicle requires deceleration, adjusting the intake valve time duration or the exhaust valve time duration to increase engine friction to decelerate the vehicle.

14. The non-transitory computer-readable storage medium of claim 12, wherein determining the vehicle requires deceleration is based on at least one of a road gradient, a traffic sign, a traffic light, a construction zone, a change in a speed limit, an obstacle in a road, a tire losing traction, a road curvature, an applied brake of the vehicle, or a cutoff of fuel to an engine.

15. The non-transitory computer-readable storage medium of claim 12, wherein the vehicle includes an engine having a cylinder with an intake valve, the intake valve may be controlled to be in at least two open positions by the processor.

16. The non-transitory computer-readable storage medium of claim 12, wherein the vehicle includes an engine having a cylinder with an exhaust valve, the exhaust valve may be controlled to be in at least two open positions by the processor.

17. The non-transitory computer-readable storage medium of claim 12, wherein the adjusting the intake valve time duration includes increasing a time interval for which an intake valve is open to increase air flowing into a cylinder during an intake stroke.

18. The non-transitory computer-readable storage medium of claim 12, wherein the adjusting the intake valve time duration includes decreasing a time interval for which an intake valve is open to increase a vacuum in a cylinder during an intake stroke.

19. A computer-implemented method comprising:

adjusting, by at least one processor, an intake valve time duration or an exhaust valve time duration to increase engine friction to enhance mechanical friction on a drivetrain of a vehicle, determining, by the at least one processor, that a battery configured to power the vehicle satisfies a predetermined threshold; and in response to determining that the vehicle requires deceleration and that the battery satisfies the predetermined threshold, adjusting, by the at least one processor, the intake valve time duration and the exhaust valve time duration to increase engine friction to enhance mechanical friction on the drivetrain of the vehicle.

* * * * *